United States Patent [19]
Hoyle et al.

[11] 3,752,276
[45] Aug. 14, 1973

[54] SYNCHRONIZATION DEVICES

[75] Inventors: David John Hoyle; Eric Albert Whateley, Huddersfield, Yorkshire, England

[73] Assignee: David Brown Gear Industries Limited, Hudderfield, England

[22] Filed: Dec. 3, 1971

[21] Appl. No.: 204,662

[30] Foreign Application Priority Data
Dec. 18, 1970  Great Britain ............... 60,360/70

[52] U.S. Cl. .......................... 192/53 E, 192/53 G
[51] Int. Cl. ............................................ F16d 23/06
[58] Field of Search ............... 192/53 E, 53 F, 53 G

[56] References Cited
UNITED STATES PATENTS

| | | | |
|---|---|---|---|
| 2,245,816 | 6/1941 | Peterson | 192/53 E |
| 2,175,911 | 10/1939 | Peterson | 192/53 E |
| 1,886,850 | 11/1932 | Tenney | 192/53 E X |
| 2,131,199 | 9/1938 | Tenney | 192/53 E |
| 2,238,370 | 4/1941 | Peterson | 192/53 E X |
| 2,369,843 | 2/1945 | Neracher et al. | 192/53 E |
| 2,376,512 | 5/1945 | Schotz | 192/53 E |

FOREIGN PATENTS OR APPLICATIONS
752,115  7/1938  France ............... 192/53 E

*Primary Examiner*—Allan D. Hermann
*Attorney*—Norris & Bateman

[57] ABSTRACT

A synchronization device associated with a dog clutch for selectively connecting either of two rotating driving members to a rotatable driven shaft comprises a sleeve moveable axially upon the slidable toothed member of the dog clutch and having friction cones at its ends engageable alternatively with respective mating surfaces on the driving members, at least one longitudinally-extending slot of cranked shape forming inclined baulking surfaces in the sleeve, and a cylindrical pin passing through said slot and engaging at its radially inner end in a hole in said slidable toothed member and at its outer end in a hole in a ring slidable axially on the sleeve by a selector fork of a gear shift mechanism.

4 Claims, 2 Drawing Figures

3,752,276

SYNCHRONIZATION DEVICES

BACKGROUND OF INVENTION

The invention relates to a synchronization device, for a variable-speed gearbox, of the type comprising a synchronizing sleeve having a friction cone at each of its ends, at least one longitudinally-extending slot having inclined baulking surfaces formed in the sleeve, and a radially disposed pin passing through the slot and engaging at its inner end a slidable clutch member and at its outer end a ring slidable on the sleeve, a conventional gear shift mechanism being provided for moving the ring, the pin and the clutch member axially of the sleeve.

In a known synchronization device of this type, one pair of baulking surfaces is formed at each side of the or each slot between its ends, and each pair of baulking surfaces comprises the two sides of a circumferentially V-shaped notch having an included angle of 60°, the apices of the two notches lying in a common plane perpendicular to the axis of the sleeve. That part of the pin which co-acts with the baulking surfaces and the slot is hexagonal in shape. When the clutch member is in a central, neutral position the pin is engaged in one of the V-shaped notches. Initial movement of the pin from the neutral position carries the sleeve with it until the appropriate friction cone makes contact wth a mating surface on a rotating member with which the sleeve is to be synchronized. When this frictional contact has caused the rotational speed of the sleeve to become equal to that of the rotating member, the pin can slide up the inclined baulking surface and move axially of the sleeve to one end of the slot to engage the slidable clutch member positively with the rotating member.

This known synchronizing sleeve and pin assembly is suitable for the synchronization of a slidable clutch member disposed between two rotating members with either of said members, regardless of whether the rotational speed of each rotating member is initially randomly faster or slower than the rotational speed of the clutch member.

The known synchronization device described above is expensive to produce and unnecessary in an arrangement, for the synchronization of a slidable clutch member disposed between two rotating members with either of said members, where each rotating member is initially always rotating faster or always rotating slower than the clutch member.

The object of the invention is to provide a synchronization device of the type referred to which is suitable for the synchronization of the arrangement referred to in the preceding paragraph.

SUMMARY OF INVENTION

According to the invention, a synchronization device comprises a sleeve having a friction cone at each of its ends and at least one longitudinally-extending slot of cranked shape, the end portions of the slot being both parallel to the axis of the sleeve but circumferentially offset from one another and being joined by an inclined portion which forms baulking surfaces.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 1:
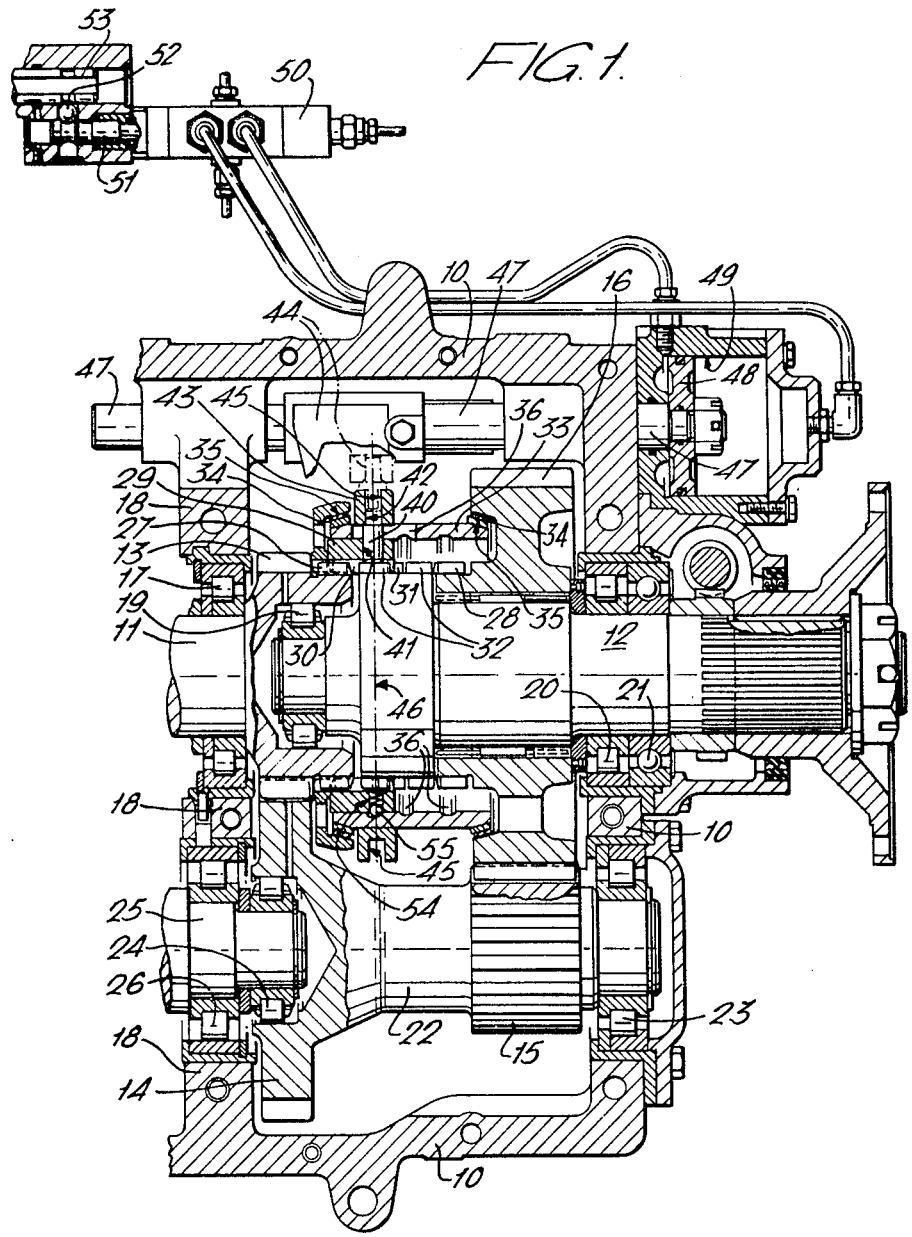
FIG. 1 is a sectional side elevation of a dual-range portion of a vehicle gearbox.

Referring now to FIG. 1 of the drawings, a gearbox for a vehicle has a conventional variable-speed and reverse portion (not shown) in series with a dual-range portion, both portions being housed within the same case 10. The input shaft of the variable-speed and reverse portion, which constitutes the input shaft of the whole gearbox, is disengagably connected to an engine by a main transmission clutch in well-known manner. The output shaft of the variable-speed and reverse portion, which constitutes an intermediate shaft of the whole gearbox and is hereinafter referred to as the intermediate shaft 11, can be connected selectively by positive clutch means hereinafter described to the output shaft of the dual-range portion, which constitutes the output shaft of the whole gearbox and is hereinafter referred to as the output shaft 12, either directly for high range or by way of speed reduction gears 13, 14, 15, 16 for low range. The two shafts 11 and 12 are coaxial, the intermediate shaft 11 being rotatably supported near one end in a bearing 17 housed in a web 18 of the case 10, and the output shaft 12 being rotatably supported at one end in a bearing 19 housed in said end of the intermediate shaft 11 and rotatably supported between its ends in contiguous bearings 20, 21 housed in the case 10. The gear 13 is formed integrally on the intermediate shaft 11 between the bearing 17 and said end of said shaft, the gear 16 rotatably mounted on the output shaft 12, and the gears 14 and 15 are integral with a countershaft 22. One end of said countershaft is rotatably suppported in a bearing 23 housed in the case 10, and its other end is rotatably supported on a bearing 24 carried by one end of the layshaft 25 of the variable-speed and reverse portion. Said layshaft is rotatably supported near said end in a bearing 26 housed in the web 18. The positive clutch means comprise a set of external clutch teeth 27 at said end of the intermediate shaft 11, a set of external clutch teeth 28 at the adjacent end of the gear 16, external teeth 31, 32 hereinafter referred to on the output shaft 12 between the intermediate shaft 11 and said gear, and a clutch member 29 having internal clutch teeth 30 slidable axially on the last-mentioned external teeth 31, 32 in either direction so as to be engagable also with one of said sets of external clutch teeth 27 and 28. The external teeth on the output shaft 12 are provided with a conventional clutch lock, that is to say the tooth thickness in a central zone 31 is greater than that in the two end zones 32. Surrounding the slidable clutch member 29 is a synchronizing sleeve 33 having an annular friction lining 34 with a conical outer surface bonded to each of its ends. The conical outer surface of each lining 34 is adapted to make contact upon slight axial movement of the sleeve 33 in the appropriate direction with a mating surface 35 on the intermediate shaft 11 or on the gear 16 as the case may be.

Figure 2:
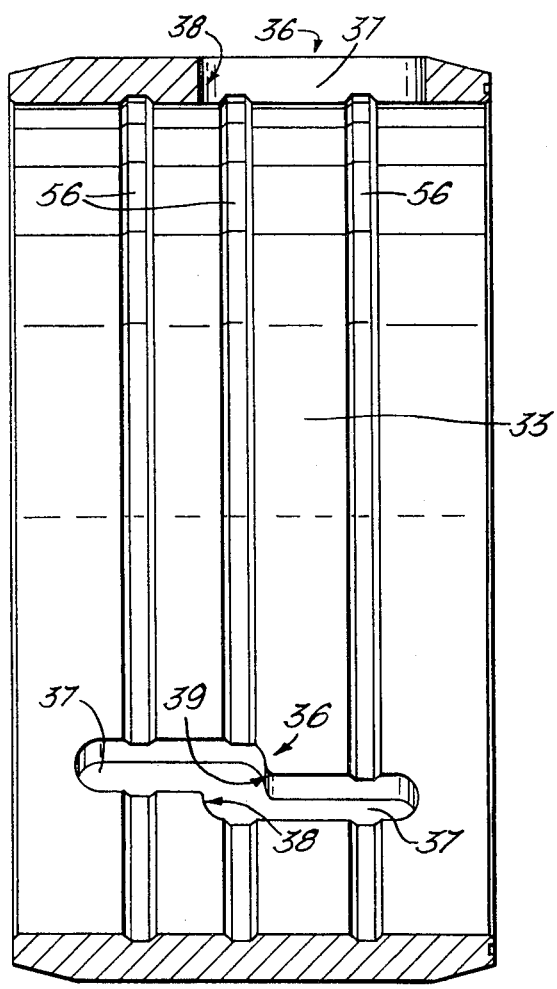
FIG. 2 is a sectional side elevation on a larger scale of a synchronizing sleeve forming part of said portion.

Referring now to FIG. 2 of the drawings, the sleeve 33 contains three longitudinally-extending slots 36 of cranked shape two of the angular spaces between which are equal whilst the third of said spaces is somewhat smaller than its fellows for a reason hereinafter explained. The end portions 37 of each slot are both parallel to the axis of the sleeve 33 but so circumferentially offset from one another that one side of one portion is aligned with the other side of the other portion, and said portions are joined by an inclined portion the sides of which form baulking surfaces. Due to the disparity in speed differences to be synchronized when the respective baulking surfaces are operative, one side 38 of the inclined portion is disposed at a helix angle of, say, 10° and the other side 39 thereof is disposed at a helix angle of, say, 22°.

Referring once again to FIG. 1 of the drawings, a cylindrical actuating pin 40 passes radially through each of the three slots 36 and engages at its inner end a hole 41 in the slidable clutch member 29 and at its outer end a hole 42 in a ring 43 which is slidable axially along the periphery of the sleeve 33 by a selector fork 44 engaging in an annular groove 45 formed in the periphery of said ring. The angular spaces between the holes 41 and between holes 42 must of course be identical to the angular spaces between the slot 36. The axes of the three actuating pins 40 lie in a common plane 46 perpendicular to the axis of the shafts 11 and 12 and sleeve 33. The selector fork 44 is carried by an axially moveable selector rod 47 to which there is secured a piston 48 disposed in a double-acting pneumatic cylinder 49 supplied with compressed air by way of a control valve 50 having an axially slidable spool 51. Interlock means comprising a ball 52 and associated annular grooves in said spool and in a rotatable and axially slidable main control rod 53 for the variable-speed and reverse portion of the gearbox operate to prevent movement of the selector fork 44 except when said portion is in its neutral condition, that is to say when there is no driving connection between its input shaft and the intermediate shaft 11. The slidable clutch member 29 has three radial bores 54 alternating with the holes 41, the angular spaces between said bores being identical to the angular spaces between the slots 36 for the same reason hereinafter explained. The axes of the bores 54 lie in the plane 46, and in each of said bores there is housed a spring-loaded ball 55. The three balls 55 are adapted to engage in the appropriate one of three axially-spaced annular grooves 56 (see FIG. 2) formed in the bore of the sleeve 33.

The angular spaces between the slots 36 (and thus between the holes 41 and between the holes 42), and the angular spaces between the bores 54, are made as near equal as possible having regard to the number of internal clutch teeth 30 formed in the slidable clutch member 29, since it is desirable that the holes 41 and the bores 54 in said member should be aligned with respective gaps between said teeth and not intersect the tooth flanks. In suitable cases, therefore, the slots 36, the holes 41, the holes 42 and the bores 54 would be equally spaced angularly.

In operation, the synchronization device is not required to operate when reverse gear is engaged because gear changes are not made when the vehicle is proceeding in reverse, nor is the device required to operate when gear changes are made with the vehicle stationary. However, when a gear change is made with the vehicle proceeding forwards and the synchronization device is required to operate, the torque acting on the slidable clutch member 29 is always in the same direction.

When it is necessary to change gear in the dual-range portion of the gearbox, for example from high range to low range, the vehicle's main transmission clutch is disengaged, the variable-speed and reverse portion of the gearbox is put into its neutral condition, and the ring 43 carrying the actuating pin 40 is moved axially along the sleeve 33 by the selector fork 44. The actuating pins 40 move the slidable clutch member 29 which initially carries the sleeve 33 with it, due to the engagement of the spring-loaded balls 55 in one of the two outer annular grooves 56, until the appropriate friction lining 34 contacts the mating surface 35 on the gear 16. Further movement of the ring 43 disengages the balls 55 from said groove, moves the slidable clutch member 29 out of engagement with the clutch teeth 27 on the intermediate shaft 11 against the action of the clutch lock, and brings the pins 40 into engagement with the baulking surfaces formed by the sides 39 of the inclined portions of the slots 36 thus forcing the last-mentioned friction lining 34 into operative synchronizing engagement with its mating surface 35 on the gear 16. When the rotational speeds of said gear and the output shaft 12 become synchronized the pins 40 can slide up the inclined baulking surfaces formed by the sides 39, causing a slight rotation of the sleeve 33 and gear 16 relative to the output shaft 12 to facilitate engagement of the slidable clutch member 29 with the clutch teeth 28 on said gear. The spring-loaded balls 55 in the slidable clutch member 29 ride through the central one of the annular grooves 56 formed in the sleeve 33 (which central groove is provided to locate said member in a neutral position in which there is no driving connection either directly or by way of the speed reduction gears 13, 14, 15, 16 between the intermediate shaft 11 and the output shaft 12), and as the actuating pins 40 move to the ends of the slots 36 said member engages with the clutch teeth 28 on the gear 16 to connect said gear drivably to the output shaft 12 whilst the balls 55 engage in the other of the two outer annular grooves 56.

The change from low range to high range entails a similar sequence of events to that described in the preceding paragraph, but acting in the opposite direction so as to conclude with engagement between the slidable clutch member 29 and the clutch teeth 27 on the intermediate shaft 11 and involving baulking engagement between the pins 40 and the sides 38 of the inclined portions of the slots 36.

What we claim is:

1. A synchronization device comprising a slidable clutch member having internal clutch teeth, a synchronizing sleeve surrounding and relatively longitudinally displaceable relative to said clutch member and having a friction cone at each of its ends and at least one longitudinally extending slot of cranked shape, the end portions of the slot being both parallel to the axis of the sleeve but circumferentially offset from one another and being joined by an inclined portion which forms baulking surfaces, an actuator movable longitudinally of said sleeve and mounting a pin extending through said slot into motion transmitting engagement with said clutch member, means providing three axially spaced annuar grooves in the bore of said sleeve, and at least one spring loaded ball housed on said clutch member adapted for selective engagement in one of said grooves for releasably interconnecting said clutch member and sleeve in relatively displaced positions of said clutch member along said sleeve.

2. A synchronization device according to claim 1, wherein the opposite sides of the inclined portion are inclined at different angles.

3. A synchronization device according to claim 1, wherein said sleeve has a plurality of slots spaced angularly as nearly equally apart as possible but aligned with respective gaps between said teeth on the clutch member.

4. A synchronization device as defined in claim 1, wherein said inclined portion of said slot is located at the intersection of said slot with the central one of said three grooves.

* * * * *